2,893,920

PRO-ELASTASE AND PREPARATION THEREOF

Norman H. Grant and Kenneth C. Robbins, Chicago, Ill., assignors to Armour and Company, Chicago, Ill., a corporation of Illinois No Drawing. Application October 3, 1955
Serial No. 538,241

11 Claims. (Cl. 195—62)

This invention relates to an elastolytic enzyme substance, and more particularly to an inactive elastase precursor, i.e., pro-elastase, and to the preparation thereof.

Elastase is an enzyme which effects the dissolution of elastin (elastolysis), and consequently may also be defined as an elastolytic enzyme. Elastin is one of the proteinaceous substances responsible for the elasticity of the connective and skeletal tissues, such as blood vessels, skin, etc. The solubilizing action of this enzyme upon an elastin substrate has not been too well characterized, but it is believed to involve the transforming of elastin from the fibrous into the globular form. The elastase has been derived from mammalian pancreas tissue, such as hog pancreas glands, and from pancreatic juice, e.g. dog pancreatic juice.

It had been presumed that elastase is contained in elastase-bearing tissue in the active form as differentiated from trypsin and chymotrypsin which in the native state exist as the inactive precursor, i.e. trypsinogen and chymotrypsinogen. The trypsinogen may be converted to trypsin by enterokinase which is secreted by the duodenum, while chymotrypsinogen can be converted into the active enzyme by trypsin but not by enterokinase.

We have discovered an inactive elastase precursor which can be exposed to the action of trypsin to obtain elastase. Also, this elastase precursor can be converted to elastase by a combination of trypsinogen and enterokinase. Thus, this inactive elastase precursor may be designated pro-elastase. Pro-elastase has been found to be insoluble in water, and may be derived from elastase-bearing tissue under such conditions as render the tryptic activity of such tissue negligible. For the purposes of this invention, "pro-elastase-bearing tissue" shall refer to elastase-bearing tissue which has been treated so that the pro-elastase therein has not been converted to elastase by the action of trypsin, e.g. by being substantially free from tryptic activity. The pro-elastase should be separated from at least a portion of the cells of the elastase-bearing tissue, and preferably is substantially free from such tissue cells. Also, the elastase precursor may be substantially free from lipids, carbohydrates and contaminant proteins. An especially desirable pro-elastase may be substantially free from proteinases, such as chymotrypsin; proteolytic pro-enzymes, such as trypsinogen and chymotrypsinogen; and other pancreatic enzymes, such as ribonuclease, desoxyribonuclease and carboxypeptidase, as well as being free from tissue cells. The pro-elastase, upon conversion to elastase, should demonstrate a potency of at least 0.02 elastolytic unit per mg. of protein. A better pro-elastase preparation should have a potency, after activation, of at least 0.1 elastolytic unit per mg. of protein, and especially desirable results may be achieved with a pro-elastase, which upon conversion to elastase, demonstrates a potency of at least 0.5 elastolytic unit per mg. of protein.

Although pro-elastase may be derived from any elastase-bearing tissue under conditions such that the tryptic activity thereof is negligible, better results are obtained when this elastase precursor is derived from elastase-bearing tissue substantially free from tryptic activity. An especially desirable pro-elastase may be obtained from elastase-bearing tissue substantially free from trypsin. This elastase-bearing tissue may be mammalian pancreas glands, e.g. hog, beef and sheep, or pancreatic juice, and we have found that hog pancreas tissue and dog pancreatic juice are especially desirable sources of pro-elastase. Preparatory to the extraction of pro-elastase, pancrease glands may be sub-divided by procedures such as hashing, grinding or comminuting, and, if desired, defatted by solvent extraction employing such solvents as acetone, xylene and petroleum hydrocarbon fractions. The pancreas tissue or pancreatic juice can be stored in the frozen state prior to utilization to prevent conversion of trypsinogen to trypsin by autolysis, and the consequent activation of pro-elastase. Extraction of the elastase precursor from pro-elastase-bearing tissue may involve treating comminuted hog pancreas tissue at approximately neutral pH with an aqueous solution to obtain an aqueous extract of pro-elastase. This aqueous extract can be separated from the tissue residue by such procedures as centrifugation and filtration, and the separated extract subjected to further purification to provide a pro-elastase substantially free from contaminant substances. A minor proportion of a water-soluble salt, e.g. about 0.5% (weight/volume) of sodium chloride, may be included in the aqueous extraction slurry to facilitate solubilization of the pro-elastase. The extraction of pro-elastase from pancreas tissue with an aqueous saline solution may be completed in about 2 to 3 hours at a temperature of 24° C., and in about 10 to 16 hours at a temperature of 0° C. It may be desirable to maintain the extraction slurry at a temperature of about 0 to 5° C. to prevent activation of pro-elastase by trypsin. The aqueous extract of pancreas tissue may be dried by lyophilization to provide a stable pro-elastase product.

The preparation of elastase and pro-elastase by a process adaptable to large scale manufacture has been described in our co-pending patent application Serial No. 538,242, filed October, 1956, wherein a preferred practice of the process invloves contacting an aqueous extract of hog pancreas tissue with a carboxylic acid ion exchange resin, such as XE-97 and IRC-50 (manufactured by Rohm and Haas), at a pH of about 4.7 and an ionic strength of about 0.05 to adsorb the elastolytic enzyme substance on the ion exchange resin. The elastolytic enzyme substance may then be eluted from the ion exchange resin with an aqueous saline solution having a pH of about 4.7 and an ionic strength of from 0.8 to 1.5. Another method of preparing elastase and pro-elastase is described in our co-pending patent application Serial No. 538,240, filed October 3, 1956. A preferred method of obtaining pro-elastase involves adsorbing pro-elastase from an aqueous concentrate of pro-elastase on elastin at a pH of at least 4.0, i.e. a pH within the range of 4 to 10. Better adsorption results may be achieved with pro-elastase at a pH of from 7.0 to 9.5, and especially desirable pro-elastase adsorption may be obtained at a pH of about 8.0. The temperature for obtaining adsorption of pro-elastase on elastin may be about 25° C. The pro-elastase may then be eluted from the elastin at a pH of not more than 4.0, that is, within the range of from about 2 to about 4. Especially desirable results are achieved by eluting pro-elastase from elastin with an aqueous solution having a pH of from about 3.0 to about 3.5.

The adsorption of the pro-elastase on elastin may be enhanced if the ionic strength of the aqueous concentrate is within the range of from about 0.01 to about 2. Better adsorption is obtained at an ionic strength of from about 0.05 to 0.3, and especially desirable results are achieved at ionic strengths of about 0.2.

The pro-elastase may be converted to elastase by a method similar to that employed in the conversion of chymotrypsinogen to chymotrypsin by the action of trypsin. For example, the activation of pro-elastase may be achieved by incubating the aqueous solution of the inactive enzyme at a pH of at least 5.0, and preferably about pH 7.4, with trypsin for a period of at least 3 minutes, and preferably about 20 minutes, at a temperature of approximately 24° C. On the other hand, activation of pro-elastase may be obtained at a temperature of about 0° C. after a period of about 6 hours, and preferably from about 12 to 24 hours.

The elastolytic potency of elastase obtained by the activation of this pro-elastase may be determined upon an elastin substrate derived from beef aorta. This elastin substrate can be prepared by boiling sub-divided beef aortic tissue in 0.1 N alkali (sodium hydroxide) solution for a period of 1 hour, then neutralizing the elastin with acid and washing with water. This alkaline hydrolysis operation may be repeated on the separated elastin, and the resulting product dried with acetone. The elastase analytical procedure involves mixing 1 cc. of water, containing 20 mg. of dry elastin, with 0.5 cc. of pH 7.4 to 0.5 M Sorenson phosphate buffer solution and with 1 ml. of elastase solution. The resulting mixture can be incubated at a temperature of 37° C. for a period of 30 minutes, with shaking, and thereafter the elastolysate can be chilled to a temperature of about 0° C. After settling for about 5 minutes, the undissolved elastin substrate can be separated from the supernatant liquid by filtration using S and S No. 595 filter paper. The protein content of the filtrate thereupon obtained can be determined by such methods as folin phenol, biuret and ultraviolet absorption at a wave length of 280 m$\mu$. The net amount of soluble protein can be calculated as the activity of the enzyme, i.e. the difference between the protein content of the elastin substrate and that of the undissolved elastolysate is the activity of the enzyme. This assay value can be expressed as elastolytic units, wherein one unit is equal to $(Y-0.08)/2$; Y being the net optical density of the elastolysate at a wave length of 280 m$\mu$.

We have found that an elastase releasing composition may be produced as an adsorbate of pro-elastase on elastin. This composition may also include trypsin or a mixture of trypsin and a duodenal concentrate containing enterokinase. Upon incubating this composition under conditions such that the pro-elastase can be converted to elastase there is obtained a slow and regulated release of the active enzyme from the elastin into the surrounding medium. This elastase-releasing composition may be utilized in the parenteral administration of elastase for therapeutic purposes. This pro-elastase elastin adsorbate should be maintained under such conditions that the pro-elastase is not activated to produce elastolysis during storage. In aqueous suspension, in the presence of trypsin, the prevention of elastolysis may be achieved by maintaining the adsorbate at a pH of from 4.0 to 5.0, and preferably about 4.7. The rate of elastolysis and pro-elastase activation by trypsin are reduced at refrigerator temperature, and thus the adsorbate may be desirably maintained at a temperature of from about 0 to 5° C. Further, the complex may be maintained in the inactive state by handling it as dry product, such as a lyophile product.

The elastin component of the pro-elastase-elastin adsorbate may be any elastin-containing substance derived from any elastin-bearing tissue. This elastin-containing substance may be obtained as an insoluble residue from alkali or acid treated connective and skeletal tissues, such as mammalian aorta and ligamentum nuchae. A better elastin-containing substance is elastin substantially free from other albuminoids, such as collagen, lipids and other connective and skeletal tissue contaminants. An especially desirable elastin-containing substance may be prepared by the aforementioned alkali hydrolysed process, disclosed in connection with the elastase assay procedure, but a suitable elastin can be produced by the acid hydrolysis method described by D. A. Hall in Biochemical Journal: 59, 459–70 (1955), in which minced and dried ligamentum nuchae is autoclaved in 50 volumes of 1% (weight/volume) aqueous acetic acid solution for a period of 2 hours at a pressure of 15 p.s.i.g.

This pro-elastase-elastin adsorbate can be produced by contacting elastin with an aqueous concentrate of pro-elastase, such as the aforementioned aqueous extract of pancreas tissue substantially free from trypsin. The adsorption of pro-elastase on elastin may be achieved at a pH of at least 4, i.e. a pH of from 4 to about 10. Better adsorption may be obtained at a pH of from 8.0 to 9.5, and especially desirable results may be achieved at a pH of about 8.5. This elastin adsorbate may be produced by mixing the elastin in the aqueous pro-elastase concentrate, contained in a suitable mixing vessel, for a period of at least about 15 minutes at a temperature of approximately 24° C., and after a period of about 8 hours at a temperature of from 0 to 5° C. This elastin adsorbate may then be separated from residual liquid by centrifugation, filtration, etc. The separated elastin adsorbate may be dried, if desired, by lyophilization.

The dry pro-elastase-elastin adsorbate may be combined with a purified trypsin preparation such as is described in the co-pending patent application of Maxwell, L. C., et al., Serial No. 259,092, filed November 30, 1951, or with trypsinogen and enterokinase prepared according to the method set forth in Crystalline Enzymes, J. H. Northrup (Columbia University Press, N.Y., 1948).

This invention may be more fully illustrated by the following specific examples:

*Example I*

Fresh frozen hog pancreas glands were comminuted, and the sub-divided pancreas tissue extracted with 3 volumes of pH 7.0 water for a period of about 3 hours at room temperature. The resulting extract was separated from the tissue residue by centrifugation, and lyophilized. The lyophilized product was suspended in water in such amount as to produce a 2% (weight/volume) liquid mixture. This suspension was clarified by filtration. The clarified filtrate was maintained at a temperature of 0 to 5° C.

*Example II*

Pancreatic juice was collected from dogs by canulation after the dog had been treated with 100 units of secretin, nembutal and 3 mg. of mecholyl. The collected pancreatic juice was clarified by filtration and stored in the frozen state.

*Example III*

The aqueous extract of pancreas tissue prepared by the method of Example I and the dog pancreatic juice obtained by the method of Example II were subjected to activation by the following method:

The elastase analyses were obtained according to the procedure set forth hereinbefore, and in each activation system 0.4 ml. of the dog pancreatic juice or hog pancreas extract were utilized in a total volume of 1.4 ml. In these activations crystallized trypsin and alpha chymotrypsin were utilized in the amount of 0.2 mg., purified pancreas and soy bean trypsin inhibitors in the amount of 2 mg., and a 20% aqueous extract of dried and defatted hog duodenum in the amount of 0.4 ml. Activations were carried out at a temperature of 24° C. for a period of 20 minutes, with no shaking. The results were as follows:

| Activator | Elastase Activity (mg. of solubilized elastin Protein) | |
|---|---|---|
| | Pancreatic Juice | Extract |
| None | 0.7 | 0.9 |
| Trypsin | 6.3 | 4.3 |
| Alpha-Chymotrypsin | 0.9 | 0.0 |
| Duodenal Extract | 5.8 | 3.7 |
| Duodenal Extract + Soybean Trypsin Inhibitor | 0.8 | 0.4 |
| Do.[1] | 1.9 | 2.8 |
| Duodenal Extract + Pancreatic Trypsin Inhibitor | 0.6 | 0.5 |
| Do.[1] | 1.3 | 2.6 |
| Trypsin + Soybean Trypsin Inhibitor [1] | | 2.2 |
| Trypsin + Pancreatic Trypsin Inhibitor [1] | | 4.5 |

[1] The inhibitors were added to the activation tubes immediately before the aliquot was withdrawn for assay.

These results demonstrate the activation of proelastase by trypsin and by a duodenal extract, presumably containing enterokinase, in the presence of trypsinogen.

*Example IV*

Pro-elastase was purified by adsorption-elution on elastin according to the following procedure:

Comminuted hog pancreas tissue was extracted with 3 volumes of pH 7 water for a period of 18 hours at a temperature of 0° C. The resulting extract was separated from the tissue residue by centrifugation and clarified by filtration. The clarified extract was lyophilized. This lyophilized product was dissolved in water in an amount such as to produce a 6% (weight/volume) solution. This solution, in a volume of 50 ml., was mixed with 500 mg. of powdered elastin, derived from aorta by an alkaline hydrolysis procedure. The resulting mixture was stirred for a period of 30 minutes at a temperature of 24° C. The precipitate was separated from the effluent liquid by centrifugation for a period of 10 minutes at a speed of 1500 r.p.m. This precipitate or adsorbate was washed twice with 50 ml. of water. The washed adsorbate was eluted with 50 ml. of 0.2 N acetic acid by mixing for a period of 30 minutes at a temperature of 24° C.

The resulting eluate was activated with 0.004% of trypsin, and the potency thereof compared with that of a portion of the original pro-elastase solution also activated with 0.004% of trypsin. The results were as follows:

| Activation Conditions | Activity (Elastolytic Units per mg. of Protein) | | Yield of Enzyme Substance, percent |
|---|---|---|---|
| | Original Solution | Eluate | |
| 18 hr; 0° C | 0.02 | 0.62 | 63 |
| 5 min; 24° C | 0.04 | 0.88 | 53 |

While in the foregoing specification various embodiments of this invention have been set forth and specific details thereof elaborated for the purpose of illustration, it will be apparent to those skilled in the art that the invention is susceptible to other embodiments and that many of these details may be varied widely without departing from the basic concept and spirit of the invention.

We claim:

1. An elastolytic enzyme substance characterized by being an inactive elastase precursor derived from elastase-bearing tissue substantially free from tryptic activity, being substantially free from tissue cells, and being capable of conversion to elastase by the action of trypsin to demonstrate a potency of at least 0.02 elastolytic unit per mg. of protein.

2. An elastolytic enzyme substance, characterized by being an inactive elastase precursor derived from elastase-bearing tissue substantially free from trypsin, being substantially free from tissue cells, chymotrypsin, chymotrypsinogen, trypsinogen, ribonuclease, desoxyribonuclease and carboxypeptidase, and being capable of conversion into elastase by the action of trypsin to demonstrate a potency of at least 0.5 elastolytic unit per mg. of protein.

3. An elastolytic enzyme substance characterized by being an inactive elastase precursor derived from pancreatic tissue under conditions such that the tryptic activity thereof is negligible, being free from pancreas tissue cells, and being capable of conversion to elastase by the action of trypsin to demonstrate a potency of at least 0.1 elastolytic unit per mg. of protein.

4. An elastolytic enzyme substance, characterized by being an inactive elastase precursor derived from elastase-bearing tissue under conditions such that the tryptic activity thereof is negligible, being free from elastase-bearing tissue cells, and being capable of conversion to elastase by the action of trypsin to demonstrate a potency of at least 0.02 elastolytic unit per mg. of protein.

5. An elastolytic enzyme substance characterized by being an inactive elastase precursor derived from pancreatic juice under conditions such that the tryptic activity thereof is negligible, being free from pancreas tissue cells, and being capable of conversion to elastase by the action of trypsin to demonstrate a potency of at least 0.1 elastolytic unit per mg. of protein.

6. An elastolytic enzyme substance characterized by being an inactive elastase precursor derived from mammalian pancreas blands under conditions such that the tryptic activity thereof is negligible, being free from pancreas tissue cells, and being capable of conversion to elastase by the action of trypsin to demonstrate a potency of at least 0.1 elastolytic unit per mg. of protein.

7. The process for preparing an elastolytic enzyme substance, which is an elastase precursor, comprising contacting an aqueous, substantially elastase free, pro-elastase concentrate with elastin at a pH of from 4.0 to 10.0 to adsorb the pro-elastase on said elastin, and then eluting said pro-elastase from the elastin.

8. The process of preparing an elastolytic enzyme substance, which is an elastase precursor, comprising contacting an aqueous, substantially elastase free, pro-elastase concentrate with elastin at a pH of from 4.0 to 10.0 to adsorb the pro-elastase on said elastin, and contacting the resulting adsorbate with an aqueous solution at a pH of from 2.0 to 4.0 to elute said pro-elastase from the elastin.

9. The process of preparing an elastolytic enzyme substance, which is an elastase precursor, comprising contacting an aqueous, substantially elastase free, pro-elastase concentrate with elastin at a pH of from 7.0 to 9.5 to adsorb the pro-elastase on said elastin, and contacting the resulting adsorbate with an aqueous solution at a pH of from 3.0 to 3.5 to elute said pro-elastase from the elastin.

10. In a process for preparing an elastolytic enzyme substance, which is an elastase precursor, wherein elastase bearing tissue substantially free from trypsin is extracted to obtain an aqueous concentrate of pro-elastase, said aqueous concentrate being substantially free of elastase, the steps of contacting said aqueous concentrate with elastin at a pH of from 4.0 to 10.0 to adsorb the pro-elastase on said elastin, and contacting the resulting adsorbate with an aqueous solution at a pH of from 3.0 to 3.5 to elute said pro-elastase from the elastin.

11. The process of claim 10 in which said elastin is an elastin containing substance.

References Cited in the file of this patent

"Advances in Enzymology," vol. 14, 1953, published by Interscience Publishing Inc. (New York), pages 341, 343, 400 and 401.

"Biochemical Journal," vol. 59, No. 3, March 1955, pages 465 to 470.